United States Patent [19]

Annou et al.

[11] Patent Number: 5,638,254

[45] Date of Patent: Jun. 10, 1997

[54] GAS INSULATED SWITCH GEAR DEVICE

[75] Inventors: Kenji Annou; Masatomo Ohno, both of Hitachi; Kyuji Yaginuma, Hitachinaka, all of Japan

[73] Assignee: Hitachi, Ltd., Tokyo, Japan

[21] Appl. No.: 402,825

[22] Filed: Mar. 13, 1995

[30] Foreign Application Priority Data

Mar. 18, 1994 [JP] Japan .................................. 6-048726

[51] Int. Cl.⁶ ............................................ H02B 5/00
[52] U.S. Cl. ............................................ 361/604; 361/618
[58] Field of Search ................................ 361/602, 604, 361/611–612, 618, 624, 637–639, 648–650

[56] References Cited

U.S. PATENT DOCUMENTS

| | | |
|---|---|---|
| 3,778,574 | 12/1973 | Clark . |
| 4,038,486 | 7/1977 | Meyer et al. . |
| 4,215,256 | 7/1980 | Sakaguchi et al. . |
| 4,460,937 | 7/1984 | Kamata et al. ............... 361/604 |
| 4,468,716 | 8/1984 | Kamata et al. ............... 361/604 |
| 5,175,667 | 12/1992 | Kondo . |

FOREIGN PATENT DOCUMENTS

| | | |
|---|---|---|
| 058402 | 8/1982 | European Pat. Off. . |
| 2251115 | 6/1975 | France . |
| 2435843 | 4/1980 | France . |
| 61-170212 | 7/1986 | Japan . |
| 1176335 | 1/1970 | United Kingdom . |

*Primary Examiner*—Gregory D. Thompson
*Attorney, Agent, or Firm*—Fay, Sharpe, Beall, Fagan, Minnich & McKee

[57] ABSTRACT

A gas circuit breaker 40 automatically interrupts a fault current such as ground fault current flowing through a conductor 61 of a bus line 60. A high speed grounding switch 10 performs a higher grounding and its releasing operation than the open and close operation of the gas circuit breaker 40 during the open and close operation thereof and guarantees the current interrupting performance and the interelectrode insulation performance of the gas circuit breaker 40. In association with the electrode arrangement of a disconnecting switch 20, bus lines 60A and 60B are disposed in horizontal direction, a stationary electrode 13 of the high speed grounding switch 10 is provided at the constitutional unit 21 of the disconnecting switch 20 so as to locate on the same straight line as the central axis of the bus line and the movable electrode 11 at the ground side is closed along the same straight line as the central axis of the bus line. The stationary electrode 13 can be provided at a bent corner or a branching portion while locating the stationary electrode 13 and the movable electrode 11 on the same straight line as the center axis of the bus line. Thereby, durability of a gas insulated switch gear device provided with a high speed grounding switch is improved while reducing the entire size and the production cost thereof.

7 Claims, 4 Drawing Sheets

GAS INSULATED SWITCH GEAR DEVICE

BACKGROUND OF THE INVENTION

1. Field of the Industrial Application

The present invention relates to a gas insulated switch gear device used, for example, for a $SF_6$ gas insulated enclosed type substation, and, in particular, relates to a high speed grounding switch which operates to guarantee the current interrupting performance and the inter-electrode insulation performance of a gas circuit breaker.

2. Conventional Art

The gas insulated switch gear device of the type explained above used for a $SF_6$ gas insulated enclosed type substation is constituted by such constituent elements as a gas circuit breaker, a disconnecting switch, an arrester and bus lines, and the circuit breaker is designed to open a grounded power transmission line during a failure of the power transmission lines (in particular because of lightning fault) and to interrupt a fault current such as short-circuiting current and grounding fault current.

For power transmission of large capacity, the transmission voltage is high and the electro-static capacities between the power transmission lines (bus lines) of respective phases are also large, such that even after once interrupting a fault phase current as illustrated in FIG. 5 (in FIG. 5 it is assumed that power transmission line c among those of a, b and c experiences a fault phase suffered by lightning and the remaining power transmission lines a and b are sound phases), a duration time of a secondary arc current is prolonged due to an electro-static induction from the sound phases, which renders a high speed reclosing within a time desired for the power transmission system operation difficult. Namely, although the induced lightning surge voltage is reduced by the arrester, a primary arc current (as illustrated by reference A in FIG. 5) flows from the line of fault phase, thereby a surge current as illustrated by reference B is caused to occur on a transmission line of sound phase due to electro-static induction, and due to an electromotive force by the electro-static induction a further electro-static induction as illustrated by reference C is again caused on the transmission line C (fault phase) and induces the secondary arc current.

As a countermeasure to the above problem, a high speed grounding switch has been developed. The high speed grounding switch as illustrated in FIG. 5 operates at a higher speed than the open and close operation of the gas circuit breaker during the open and close operation thereof, in that the high speed grounding switch automatically grounds both ends of the opened transmission line in fault phase and immediately thereafter automatically opens the same (in other words, the high speed grounding switch grounds the transmission line in fault phase after the gas circuit breaker opens for the fault phase and then releases the grounding, and thereafter the gas circuit breaker recloses) such that the current interrupting performance and the inter-electrode insulation performance of the gas circuit breaker are guaranteed.

FIG. 6 shows a specific arrangement as an example of a conventional gas insulated switch gear device to which the above mentioned type of a high speed grounding switch is applied, wherein numeral 40 is a gas circuit breaker, 20 a disconnecting switch, 60 a bus line, 70 an arrester, 80 a bushing and between the gas circuit breaker 40 and the disconnecting switch 20 a high speed grounding switch 10 is disposed. Numeral 24 is a further grounding switch which is designed for different use and performance from those of the high speed grounding switch 10 and operates for guaranteeing the operation of the disconnecting switch 20.

Namely, the high speed grounding switch 10 is required to operate at a high speed for performing a high speed grounding operation and releasing operation thereafter in comparison with the open and close operation of the gas circuit breaker 40 during the open and close operation thereof in order to guarantee the current interrupting performance and the inter-electrode insulation performance of the gas circuit breaker 40 as explained above. On the other hand, the grounding switch 24 (as, for example, disclosed in JP-A-61-170212) for the disconnecting switch 20 is designed to ground the disconnecting switch 20 and to allow the remaining electric charge thereon to discharge toward the ground side when the gas circuit breaker 40 and the disconnecting switch 20 are opened for maintenance and inspection of the gas insulated switch gear device. Therefore, the grounding switch 24 is not required to operate at high speed even if the operation is performed either manually or automatically such that problems encountered in connection with the high speed grounding switch 10, which will be explained hereinafter, are not applicable to the grounding switch 24.

In FIG. 6, when a fault current flows in from a power transmission line via the bushing 80, the arrester 70 and a conductor (center conductor) 61 of the bus line 60, the circuit breaker 40 opens the power transmission line (bus line) for a moment and the movable electrode (movable contact) 11 of the high speed grounding switch 10 is closed at high speed toward the stationary electrode (stationary contact) 13 thereof provided at the conductor portion 61 of the bus line 60 in order to discharge the fault current toward ground.

In the FIG. 6 arrangement, the central axis direction of the conductor 61 of the bus line 60 crosses at right angles with the closing direction of the movable electrode 11 of the high speed grounding switch 10, and further the movable electrode 11 moves at high speed toward the stationary electrode 13 during fault occurrence and the conductor portion 61 is subjected to severe mechanical impact and stress, and the durability of the conductor portion is significantly damaged.

In addition, immediately after the movable electrode 11 is closed to the stationary electrode 13, an extremely large fault current flows therethrough to constitute an electrically closed circuit as illustrated by a broken line in FIG. 6 and an electro-magnetic force is induced between the stationary electrode 21 and the movable electrode 22 of the disconnecting switch 20 and the movable electrode 11 of the high speed grounding switch 10 to thereby cause a stress thereon indicated by an arrow x or x', of which stress damages the durability of the device as well as deteriorates the operating performance of the movable elements 11 and 22.

For this reason, the stationary electrode 21 and the movable electrode 22 of the disconnecting switch 20, and the movable electrode 11 and the conductor 61 provided with the stationary electrode 13 of the high speed grounding switch 10 are required to employ a structure for increasing the mechanical strength which increases the processing cost of their parts and the production cost thereof.

Further, with the above arrangement structure, the high speed grounding switch 10 is accommodated in a sectioned insulation gas chamber between the gas circuit breaker 40 and the disconnecting switch 20 which requires many insulation spacers disposed therebetween. As a result, the possibility of common use of conventional parts thereof is reduced, the size of the parts for constituting the high speed grounding switch 10 increases and the entire installation space for the gas insulated switch gear device also increases.

SUMMARY OF THE INVENTION

The present invention is completed in view of the above problems, and an object of the present invention is to eliminate many of the above problems and to reduce the size and the production cost of the entire gas insulated switch gear device with the high speed grounding switch as well as to improve the durability thereof.

For achieving the above problems, the present invention is fundamentally constituted by the following means for resolving the problems.

According to one aspect of the present invention, in a gas insulated switch gear device having a gas circuit breaker which automatically interrupts a fault current such as a ground fault current flowing through a bus line, a high speed grounding switch which performs a grounding operation of the bus line and releasing operation thereof at a higher speed than the open and close operation of the gas circuit breaker during the open and close operation of the gas circuit breaker and guarantees the current interrupting performance and the insulation performance between the stationary and movable electrodes thereof and a disconnecting switch; a stationary electrode and a movable electrode of the disconnecting switch being disposed in a vertical direction, respective bus line conductors to be connected to each of the stationary and movable electrodes of the disconnecting switch are disposed in a horizontal direction with a height difference therebetween with reference to the ground. Further, a stationary electrode of the high speed grounding switch is supported by a constituent element of the disconnecting switch in such a manner that the stationary electrode of the high speed grounding switch is located on the same straight line as the center axis of the bus line. Also, a movable electrode of the high speed grounding switch is located at the ground side is and disposed so as to permit movement toward the stationary electrode of the high speed grounding switch along the same straight line as the center axis of the bus line.

According to another aspect of the present invention, in the like gas insulated switch gear device provided with a gas circuit breaker and a high speed grounding switch; a stationary electrode of the high speed grounding switch is provided either at a bent corner portion of the conductor of the bus line or at a branch portion of the conductor of the bus line in such a manner that the stationary electrode of the high speed grounding switch is located along the same straight line as the center axis of the bus line. Also, a movable electrode of the high speed grounding switch is located at the ground side and disposed so as to permit movement toward the stationary electrode of the high speed grounding switch along the same straight line as the center axis of the bus line.

With the above explained constitution according to one aspect of the present invention, when a fault due to lightning occurs on a power transmission line, the gas circuit breaker at first opens and thereafter and until the gas circuit breaker recloses via the high speed grounding switch a high speed grounding of the fault power transmission line and releasing operation thereof are performed (the closing and opening operation of the high speed grounding switch), thereby the fault current such as a ground fault current is discharges in a moment to the ground.

Further, in association with the location of the electrodes of the disconnecting switch, the bus line conductor between the gas circuit breaker and the disconnecting switch and the bus line conductor between the arrester and the disconnecting switch are arranged in horizontal a direction with a height difference with reference to the ground level. Through the use of this height difference, the stationary electrode of the high speed grounding switch can be supported by the disconnecting switch (for example, the stationary electrode of the disconnecting switch) in such a manner that the stationary electrode of the high speed grounding switch is located on the same straight line as the center axis of the bus line. Further, the movable electrode is at the ground side of the high speed grounding switch so as to close the same along the same straight line as the center axis of the bus line toward the stationary electrode of the high speed grounding switch.

Accordingly, during the operation of the high speed grounding switch when the movable electrode thereof is closed to the stationary electrode, the mechanical impact force caused by the movable electrode is received by the disconnecting switch (the stationary electrode of the high speed grounding switch) which is supported by the bus line conductor along the axis thereof. As a result, the mechanical impact force caused by the closure of the movable electrode of the high speed grounding switch is absorbed both by the disconnecting switch and by the bus line along the axis thereof.

Accordingly, no bending stress is caused on the bus line conductor by the high speed closing operation of the movable electrode of the high speed grounding switch and the gas insulated switch gear device is structured to fully withstand the mechanical impact caused by the closure.

Further, from electrical point of view, since it is designed that the fault current flowing-in from a power transmission line flows out along a straight line through the bus line conductor, the constituent member of the disconnecting switch, the stationary electrode of the high speed grounding switch and the movable electrode of the high speed grounding switch, an electro-magnetic force due to the fault current possibly caused between these respective members is greatly suppressed so that the necessity of structuring the bus line conductor and the electrodes in view of the electro-magnetic force due to the fault current is eliminated.

With the above explained constitution according to the second aspect of the present invention, unlike the first aspect of the present invention, the stationary electrode of the high speed grounding switch is not supported by the disconnecting switch, but is provided either at a bent corner portion of the bus line conductor or at a branch portion of the bus line conductor in such a manner that the stationary electrode of the high speed grounding switch is located on the same straight line as the center axis of the bus line. The movable electrode at the ground side opposing the stationary electrode is disposed in such a manner that the movable electrode is permitted to close toward the stationary electrode along the same straight line as the center axis of the bus line.

With the above structure, the mechanical impact force caused by the closure of the movable electrode of the high speed grounding switch is received by the stationary electrode of the high speed grounding switch which is supported by the bus line conductor along the axial direction thereof. As a result, the mechanical impact force caused by the closure of the movable electrode of the high speed grounding switch is absorbed by the bus line along the axis thereof.

Accordingly, like the constitution according to the first aspect of the present invention, no bending stress is caused on the bus line conductor by the high speed closing operation of the movable electrode of the high speed grounding switch and the gas insulated switch gear device is structured to fully withstand the mechanical impact caused by the closure.

Further, from electrical point of view, since it is designed that the fault current flowing-in from a power transmission line flows out through the bus line conductor, the stationary electrode of the high speed grounding switch and the movable electrode of the high speed grounding switch, an electro-magnetic force due to the fault current possibly caused by the above current flow path is greatly suppressed so that the necessity of structuring the bus line conductor and the electrodes in view of the electro-magnetic force due to the fault current is eliminated.

DETAILED DESCRIPTION OF PREFERRED EMBODIMENTS

Embodiments according to the present invention are explained with reference to FIG. 1 through FIG. 4.

Figure 1:
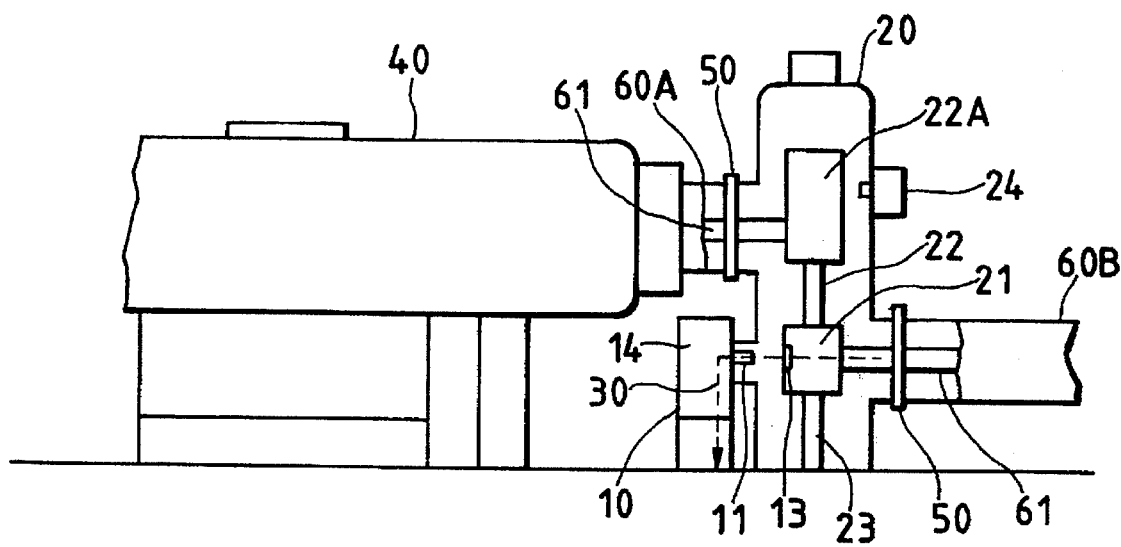
FIG. 1 is a constitutional diagram of a major portion of a first embodiment of a gas insulated switch gear device according to the present invention.
Figure 6:
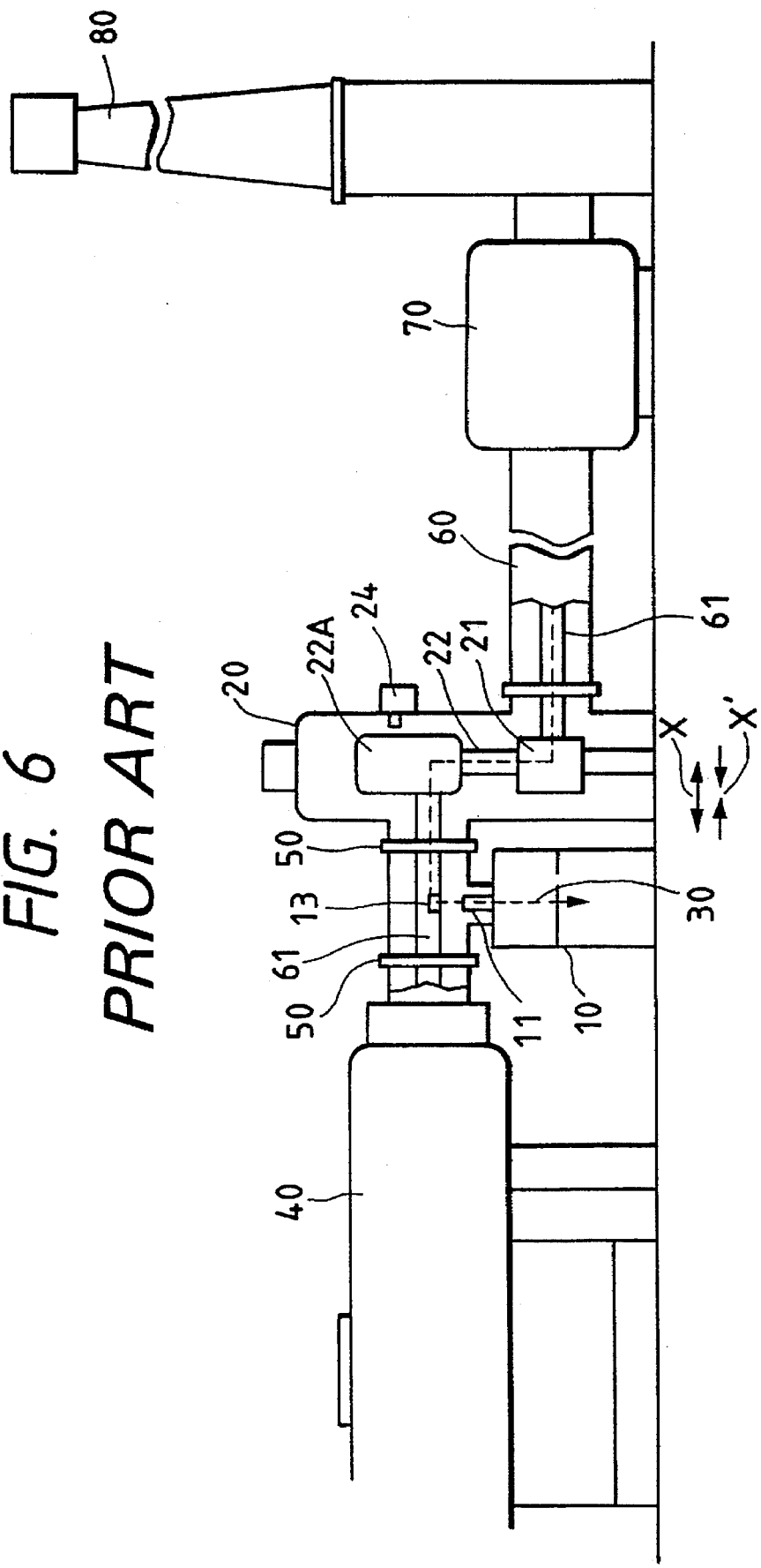
FIG. 6 is a constitutional diagram of a conventional gas insulated switch gear device provided with a high speed grounding switch.

FIG. 1 is a constitutional diagram of a major part of a first embodiment of a gas insulated switch gear device according to the present invention wherein the elements represented by the same reference numerals as in the conventional example as illustrated in FIG. 6 designate the same or equivalent elements as in the conventional example.

Namely, in FIG. 1 numeral 40 is a gas circuit breaker, 20 a disconnecting switch, 60A and 60B are bus lines, numeral 10 is a high speed grounding switch which is designed to guarantee the operation of the gas circuit breaker 40 and numeral 24 is another grounding switch which is also designed to guarantee the operation of the disconnecting switch 20. Although the illustration is omitted in the present drawing, the gas insulated switch gear device is also provided with an arrester and a bushing like one in FIG. 6. Further, for application to three phase power transmission lines each of the gas insulated switch gear devices of the present embodiment is provided for the respective phases.

In FIG. 1, the gas circuit breaker 40 and the arrester (see reference numeral 70 in FIG. 6) are disposed at different heights and the disconnecting switch 20 placed between these two members is disposed vertically with respect to the ground.

Namely, the disconnecting switch 20 is constituted by a movable electrode supporting conductive member 22A which supports the movable electrode (movable contact) 22 while permitting reciprocating movement thereof in vertical direction and the stationary electrode (stationary contact) 21 so as to oppose each other in up and down relation. In association with this arrangement, the bus line 60A connecting between the gas circuit breaker 40 and the disconnecting switch 20 and the bus line 60B connecting between the disconnecting switch 20 and the arrester not shown are disposed horizontally with respect to the ground, and the bus line 60A between the disconnecting switch 20 and the gas circuit breaker 40 is disposed at a higher level with reference to the disconnecting switch 20 than the bus line 60B between the arrester and the disconnecting switch 20 so as to constitute a height difference therebetween.

On a side wall of an enclosed container for the disconnecting switch 20, in addition to the grounding switch 24 which guarantees the operation of the disconnecting switch 20 when the same is opened, the high speed grounding switch 10 is also provided.

The high speed grounding switch 10 is designed to guarantee the current interrupting performance and the inter-electrode insulating performance of the gas circuit breaker 40 through higher speed grounding and its releasing operation than the open and close operation of the gas circuit breaker 40 during the open and close operation thereof when a fault such as lightning fault is occurred, of which use and function are different from those of the grounding switch 24 as already explained in connection with the conventional example as illustrated in FIG. 6.

Numeral 23 is a cylindrically shaped insulating supporting member which is designed to support a constituent element of the disconnecting switch 20 such as the stationary electrode 21 at the bottom portion of the disconnecting switch 20. Numeral 50 is an insulating spacer which is designed to support the conductor (center conductor) 61 of the bus line 60 and to section such as the gas circuit breaker 40 and the disconnecting switch 20.

The stationary electrode 13 of the high speed grounding switch 10 is provided at a side face of a constituent element of the disconnecting switch 20 (wherein, for example, at the stationary electrode 21 of the disconnecting switch) so as to locate the same on the same straight line as the center axis of the bus line 60B. On one hand, the movable electrode 11 of the high speed grounding switch 10 is located so as to permit closure of the same toward the stationary electrode 13 along the same straight line as the center axis of the bus line 60B. Numeral 14 is an actuating unit for the high speed grounding switch 10 which has an automatic control function of high speed open and close operation for the movable electrode 11.

When a fault such as lightning fault occurs on a power transmission line, the gas circuit breaker 40 in the gas insulated switch gear device having the above explained structure at first opens and thereafter and until the gas circuit breaker 40 recloses, via the high speed grounding switch 10 a high speed grounding and its releasing operation (closing and opening operation of the high speed grounding switch) is performed and a fault current such as ground fault current is flown away at a moment toward the ground.

When the high speed grounding switch 10 is operated as explained above, the movable electrode 11 at the ground side of the high speed grounding switch 10 is closed toward the stationary electrode 13 along the same straight line as the center axis of the bus line 60B. Thereby, the mechanical impact force of the movable electrode 11 caused when the high speed grounding switch 10 is closed is received by element (a constituent element provided with the stationary electrode 13 of the high speed grounding switch) 21 of the disconnecting switch 20 which is supported by the conductor 61 of the bus line 60B along the axial direction thereof. As a result, the mechanical impact due to the closure of the movable electrode 11 is absorbed by the constituent element 21 located at the disconnecting switch 20 and by the bus line 60B along its axial direction.

Accordingly, no bending stress is caused on the bus line conductor by the high speed closing operation of the movable electrode 11 of the high speed grounding switch 10 and the gas insulated switch gear device is structured to fully withstand the mechanical impact caused by the closure.

In particular, in the present embodiment the stationary electrode 13 of the high speed grounding switch 10 is secured to the stationary electrode 21 of the disconnecting switch 20 which is then supported by the insulating supporting member 23 from the bottom side of the disconnecting switch 20 as well as via an end of the conductor 61 of the bus line 60B arranged in perpendicular to the insulating supporting member 23 to thereby constitute a very stable two point supporting structure. As a result, the stationary electrode 21 of the disconnecting switch 20 is structured to fully withstand mechanical impacts in both vertical and horizontal directions and is provided with a sufficient mechanical strength with respect to the mechanical impact caused by the closure of the movable electrode 11 of the high speed grounding switch 10.

Further, from electrical point of view, since it is designed that the fault current flowing-in from a power transmission line flows out along a straight line through the conductor 61 of the bus line 60B, the stationary electrode 21 of the disconnecting switch 20, the stationary electrode 13 of the high speed grounding switch 10 and the movable electrode 11 of the high speed grounding switch 10 an electromagnetic force due to the fault current possibly induced such as between the stationary electrode 21 and the movable electrode 22 of the disconnecting switch 20 and the movable electrode 11 of the high speed grounding switch 10 is prevented so that no stress associated with the electromagnetic force is generated.

As a result, unlike the case of FIG. 6 conventional example wherein the high speed grounding switch 10 is disposed between the disconnecting switch 20 and the gas circuit breaker 40, the necessity of structuring the bus line conductors and the electrodes in view of mechanical structure against a possible electro-magnetic force due to the fault current is eliminated, and the durability of the gas insulated switch gear device according to the present embodiment is improved. Further, requirement with regard to mechanical strength of the respective constituent elements of the high speed grounding switch and the disconnecting switch is reduced to thereby lower the cost thereof as well as the entire structure of the device is simplified to thereby increase the reliability thereof.

Further, in the present embodiment the high speed grounding switch 10 is constituted as an additional member to the disconnecting switch 20, it is unnecessary to arrange two pieces of insulation spacers 50 between the disconnecting switch 20 and the gas circuit breaker 40 and to define and form a special operating space for the high speed grounding switch 10, thereby the conventionally required space for the installation of the high speed grounding switch 10 is saved and the entire size of the gas insulated switch gear device is reduced. Still further, in the present embodiment, since the high speed grounding switch 10 is disposed at a lower level, an earthquake resistance property is provided.

In the present embodiment, the stationary electrode 13 of the high speed grounding switch 10 is provided at the stationary electrode 21 of the disconnecting switch 20, however the present invention is not limited to such arrangement and other arrangements are also possible, and one in the following embodiment is an example thereof.

Figure 2:
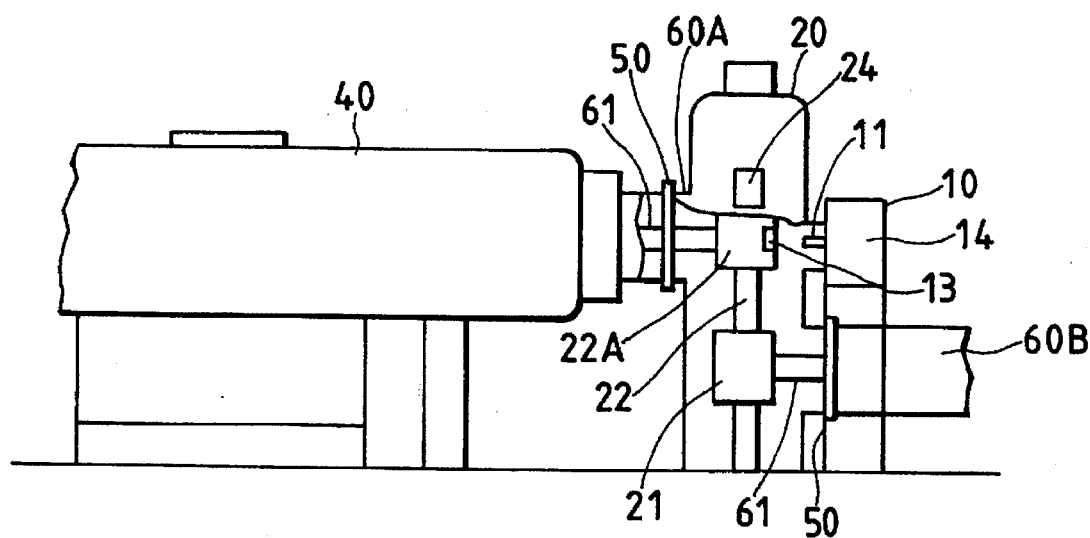
FIG. 2 is a constitutional diagram of a major portion of a second embodiment of a gas insulated switch gear device according to the present invention.

FIG. 2 is a view for explaining a major portion of the second embodiment according to the present invention, wherein the elements bearing the same reference numerals as in the first embodiments represent the same or equivalent elements as in the first embodiment.

Differences of the present embodiment from the first embodiment are in the arrangement that the stationary electrode 13 of the high speed grounding switch 10 is provided at a side face of the movable electrode supporting member 22A of the disconnecting switch 20 so as to locate the same on the same straight line as the center axis of the bus line 60A. On one hand, the movable electrode 11 is disposed so as to permit the closure thereof toward the stationary electrode 13 along the same straight line as the center axis of the bus line 60A.

In the present embodiment, the movable electrode supporting member 22A of the disconnecting switch 20 is fixedly held via the conductor 61 of the bus line 60A disposed horizontally between the gas circuit breaker 40 and the disconnecting switch 20 and via the insulating spacer 50.

In the present embodiment, during the operation of the high speed grounding switch 10 the movable electrode 11 of the high speed grounding switch 10 located at the ground side is closed toward the stationary electrode 13 along the same straight line as the center axis of the bus line 60A. Thereby, the mechanical impact force of the movable electrode 11 caused when the high speed grounding switch 10 is closed is received by movable electrode supporting member (part of the stationary electrode 13 of the high speed grounding switch) 22A of the disconnecting switch 20 which is supported by the conductor 61 of the bus line 60A along the axial direction thereof. As a result, the mechanical impact due to the closure of the movable electrode 11 is absorbed by the constituent element 22A located at the disconnecting switch 20 and by the bus line 60A along its axial direction.

Accordingly, like the first embodiment no bending stress is caused on the bus line conductor by the high speed closing operation of the movable electrode 11 of the high speed grounding switch 10 and the gas insulated switch gear device is structured to fully withstand the mechanical impact caused by the closure.

In the present embodiment, constituent parts subjected to the stress induced by the electromagnetic force due to the fault current are decreased as much as possible.

The actuating unit 14 for the high speed grounding switch 10 is disposed at the opposite side from the gas circuit breaker 40 with respect to the disconnecting switch 20. With is arrangement, the necessity of structuring the conductors and the electrodes in view of their mechanical strength in the case where the high speed grounding switch 10 is disposed between the disconnecting switch 20 and the gas circuit breaker 40 is eliminated as well as the conventional installation space for the high speed grounding switch 10 is saved.

Further, when the stationary electrode 13 of the high speed grounding switch 10 is constituted to serve also as the stationary electrode 21 of the disconnecting switch 20 or the movable electrode supporting member 22A of the disconnecting switch 20, the same advantages as explained in connection with the first and second embodiments are achieved and in addition number of required constituent parts is decreased.

Figure 3:
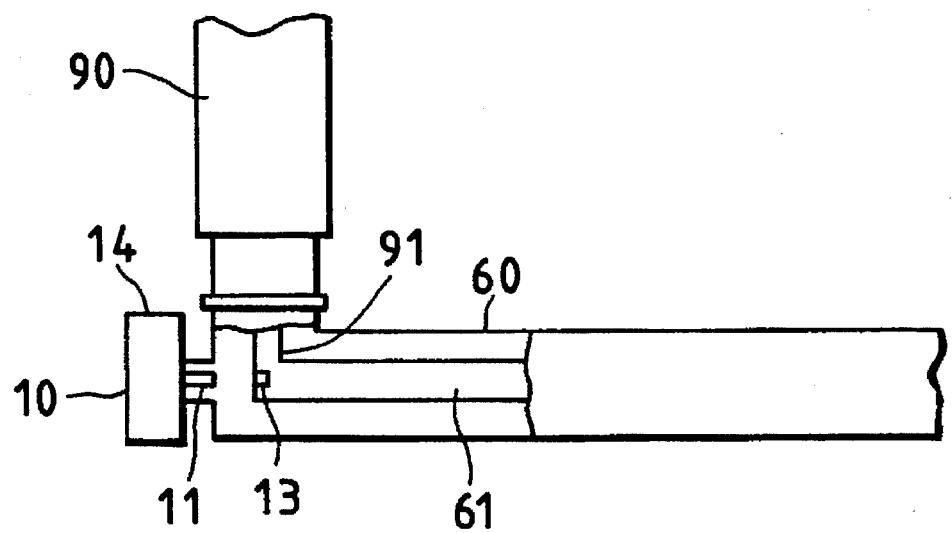
FIG. 3 is a constitutional diagram of a major portion of a third embodiment of a gas insulated switch gear device according to the present invention.

FIG. 3 shows a third embodiment according to the present invention.

The present embodiment is applied when the gas insulated switch gear device includes a constitutional unit 90 to which the conductor 61 of the bus line 60 is connected by bending the same at a right angle. The stationary electrode 13 of the high speed grounding switch 10 is provided at a portion 91 where the conductor 61 of the bus line 60 is bent at a right angle so as to locate the stationary electrode 13 on the same straight line as the center axis of the bus line 60. On one hand, the movable electrode 11 of the high speed grounding switch 10 located at the ground side is disposed so as to permit closure thereof toward the stationary electrode 13 along the same straight line as the center axis of the bus line 60.

According to the present embodiment, the mechanical impact force caused by the closure of the movable electrode 11 of the high speed grounding switch 10 is received by the stationary electrode 13 of the high speed grounding switch 10 which is supported by the conductor 61 of the bus line 60 along the axial direction thereof. As a result, the mechanical impact caused by the closure of the movable electrode 11 is absorbed by the bus line along the axial direction thereof.

Accordingly, like the first embodiment no bending stress is caused on the bus line conductor by the high speed closing operation of the movable electrode 11 of the high speed grounding switch 10 and the gas insulated switch gear device is structured to fully withstand the mechanical impact caused by the closure.

Further, from electrical point of view, since it is designed that the fault current flowing-in from a power transmission line flows out through conductor 61 of the bus line 60, the stationary electrode 13 of the high speed grounding switch 10 provided at the bus line conductor 61 and the movable electrode 11 of the high speed grounding switch 10 along a straight line, an electro-magnetic force due to the fault current possibly caused by the above current flow path is greatly suppressed so that the necessity of structring the bus line conductor and the electrodes in view of the electromagnetic force due to the fault current is eliminated, and the same advantages as explained in connection with first and second embodiments are also obtained.

Figure 4:
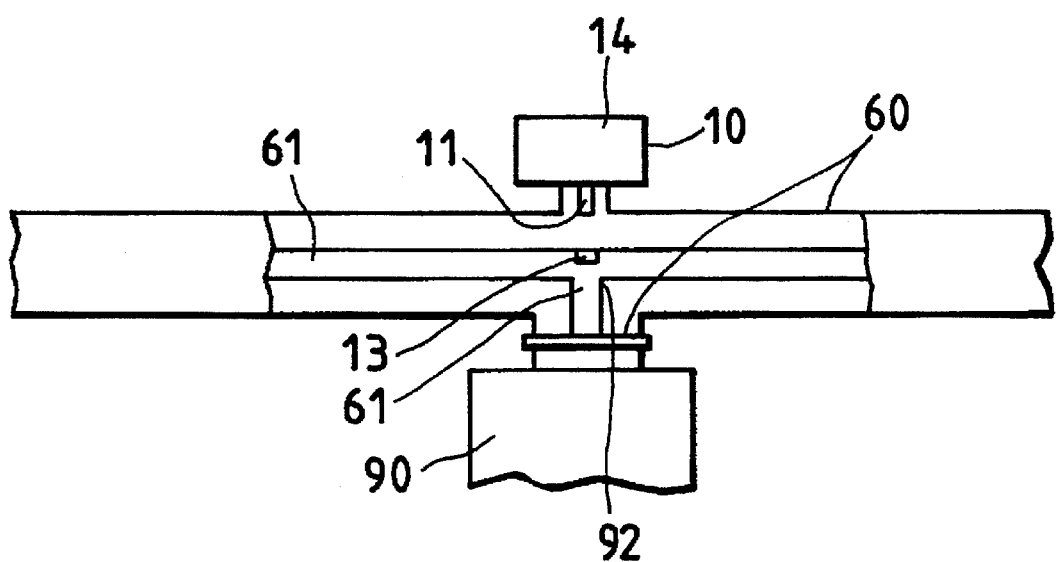
FIG. 4 is a constitutional diagram of a major portion of a fourth embodiment of a gas insulated switch gear device according to the present invention.
Figure 5:
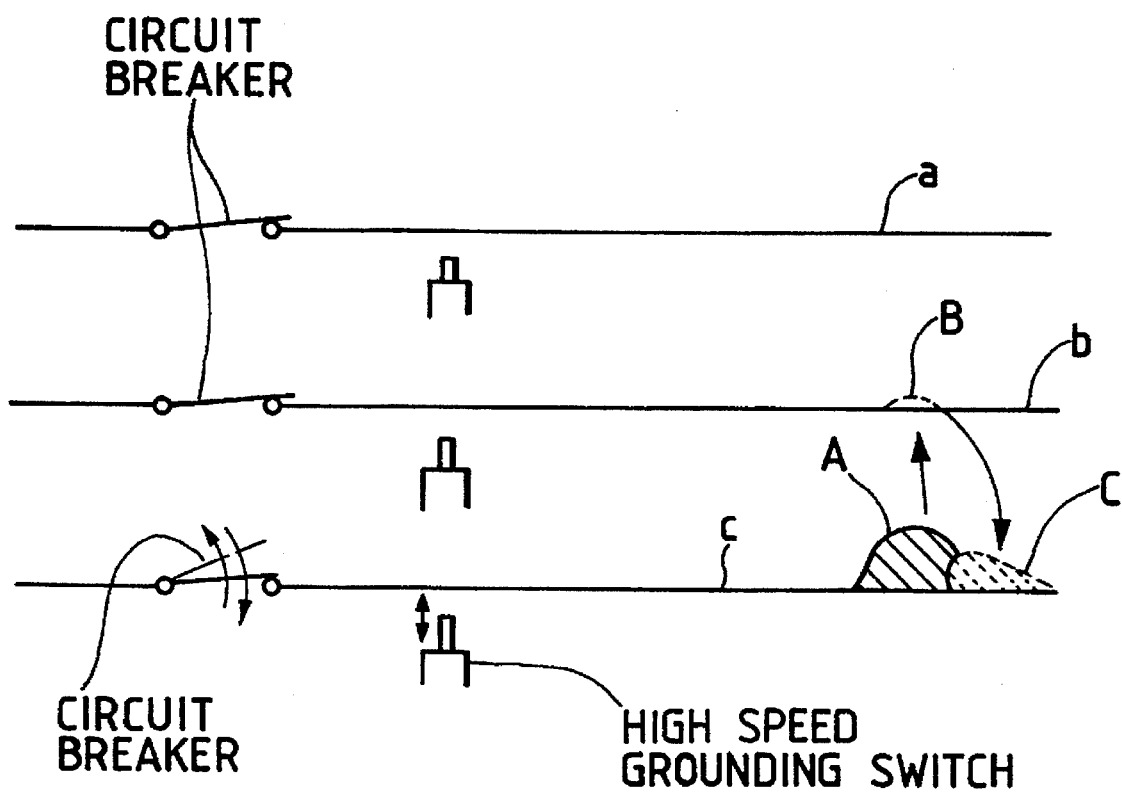
FIG. 5 is a diagram for explaining the use and function of a high speed grounding switch.

FIG. 4 shows a fourth embodiment according to the present invention.

The present embodiment is applied when the gas insulated switch gear device includes a constitutional unit 90 to which the conductor 61 of the bus line 60 is connected by branching the same. The stationary electrode 13 of the high speed grounding switch 10 is provided at a portion 92 where the conductor 61 of the bus line 60 is branched so as to locate the stationary electrode 13 on the same straight line as the center axis of the bus line 60. On one hand, the movable electrode 11 of the high speed grounding switch 10 located at the ground side is disposed so as to permit closure thereof toward the stationary electrode 13 along the same straight line as the center axis of the bus line 60.

With the present embodiment, like functioning and advantages as those of the third embodiment are also obtained.

In the gas insulated switch gear device provided with the high speed grounding switch according to the present invention, no bending stress due to a high speed closing operation of the movable electrode of the high speed grounding switch is caused on the bus line conductor, the device is further structured to fully withstand the mechanical impact induced by the closure of the movable electrode, further from electrical point of view the device is structured so as to suppress the electro-magnetic force induction between the bus line conductor and respective constitutional units due to a fault current flowing in from a power transmission line, accordingly, the durability of the gas insulated switch gear device is improved with a low production cost without necessitating a special consideration with respect to mechanical strength of the bus line conductor and constituent parts of respective constitutional units. Further, the structure of the device is simplified, thereby the reliability thereof is improved.

Further, the conventional necessity of defining and forming the special operating space by making use of the insulating spacers for the high speed grounding switch between the disconnecting switch and the gas circuit breaker is eliminated, the installation space for the high speed grounding switch is limited and the entire size of the gas insulated switch gear device is reduced.

We claim:

1. A gas insulated switch gear device, comprising:
   a gas circuit breaker that automatically interrupts a fault current flowing through a bus line;
   a high speed grounding switch having stationary and movable electrodes that performs a grounding operation of the bus line and releasing operation thereof at a higher speed than an open and close operation of said gas circuit breaker during the open and close operation of said gas circuit breaker to ensure current interrupting and insulation performance between said stationary and movable electrodes;
   a disconnecting switch having stationary and movable electrodes disposed in a vertical direction;
   wherein respective bus line conductors to be connected to corresponding ones of the stationary and movable electrodes of said disconnecting switch are disposed in a horizontal direction with a height difference therebetween and the stationary electrode of said high speed grounding switch is supported by said disconnecting switch so that the stationary electrode of said high speed grounding switch is located in a longitudinal direction of the bus line, and further wherein a movable electrode of said high speed grounding switch located at the ground side is disposed to move toward the stationary electrode of said high speed grounding switch along the longitudinal direction of the bus line.

2. A gas insulated switch gear device according to claim 1, further characterized in that, the fault current flowing through the bus line is a ground fault current.

3. A gas insulated switch gear device according to claim 1, further characterized in that, the stationary electrode of said high speed grounding switch is positioned along a straight line aligned with a center axis of the bus line.

4. A gas insulated switch gear device according to claim 1, further characterized in that, said disconnecting switch is provided with a grounding switch for said disconnecting switch which guarantees the operation of said disconnecting switch together with said high speed grounding switch.

5. A gas insulated switch gear device, comprising:
   a gas circuit breaker that automatically interrupts a fault current flowing through a bus line;
   a high speed grounding switch having stationary and movable electrodes that performs a grounding operation of the bus line and releasing operation thereof at a higher speed than an open and close operation of said gas circuit breaker during the open and close operation of said gas circuit breaker to ensure current interrupting and insulation performance between said stationary and movable electrodes;
   a disconnecting switch having stationary and movable electrodes disposed in a vertical direction;
   wherein the stationary electrode of said high speed grounding switch is provided at one of a bent corner portion of a conductor of the bus line and a branch point of the conductor of the bus line so that the stationary electrode of said high speed grounding switch is located in a longitudinal direction of the bus line, and further wherein a movable electrode of said high speed grounding switch located at the ground side is disposed to move toward the stationary electrode of said high speed grounding switch along the longitudinal direction of the bus line.

6. A gas insulated switch gear device according to claim 5, further characterized in that, the fault current flowing through the bus line is a ground fault current.

7. A gas insulated switch gear device according to claim 5, further characterized in that, the stationary electrode of said high speed grounding switch is positioned along a straight line aligned with a center axis of the bus line.

* * * * *